United States Patent Office 3,697,353
Patented Oct. 10, 1972

3,697,353
PROCESS FOR BONDING TWO SOLID ARTICLES TOGETHER IN WHICH A CATALYZED UNSATURATED POLYESTER RESIN IS USED IN COMBINATION WITH A PROMOTED UNSATURATED POLYESTER RESIN
Rene Robert Brochu, Fairfield, Conn., and Lytton Taylor, Guilford, N.C., assignors to American Cyanamid Company, Stamford, Conn.
No Drawing. Filed Mar. 17, 1970, Ser. No. 20,383
Int. Cl. B32b 7/10
U.S. Cl. 156—310
10 Claims

ABSTRACT OF THE DISCLOSURE

A process for bonding two solid articles together comprising coating the surface of one of the articles with a catalyzed unsaturated polyester resin, coating the surface of the other article with a promoted unsaturated polyester resin and bringing each of the coated surfaces into direct contact with one another.

BACKGROUND OF THE INVENTION

Unsaturated polyester resin compositions have been known for a plurality of years and these polyester resins are prepared by reacting an α,β-ethylenically unsaturated dicarboxylic acid and a polyhydric alcohol preferably a glycol with or without a dicarboxylic acid free of non-benzenoid unsaturation. These polyester resins are generally admixed with a crosslinking agent which is in the nature of a polymerizable monomer containing a

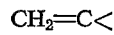

group and having a boiling point of at least about 60° C. These polyester resins can be used for making laminates, moldings, coatings or adhesives. It has been conventional in the past to incorporate into the polyester resin either during or after production such additives as inhibitors, promoters and the like. Ultimately when the polyester resin is about to be used for its selected purpose the resin is catalyzed and immediately the resin undergoes a transition from the thermosetting to the thermoset state. This transition can be accelerated by increasing the amount of promoter and/or catalyst in the system or by the application of heat. It has been found that by the use of a catalyzed polyester resin coating on one surface of a solid article and applying a coating of a promoted unsaturated polyester resin to the surface of a second article that when the two are brought together and held with the coated surfaces on each solid article in direct contact with one another that the resins will cure to the thermoset state.

FIELD OF THE INVENTION

The present invention is in the field of bonding two solid articles together using a catalyzed unsaturated polyester resin in combination with a promoted unsaturated polyester resin. These unsaturated polyester resins are prepared by reacting an α,β-ethylenically unsaturated dicarboxylic acid such as maleic acid with a glycol such as ethylene glycol with or without a dicarboxylic acid free of non-benzenoid unsaturation such as phthalic or adipic.

DESCRIPTION OF THE PRIOR ART

The most representative references relating to these unsaturated polyester resins are the U.S. Pats. 2,255,313 and 2,443,735–41, inclusive; each of which patents are incorporated herein by reference.

SUMMARY OF THE INVENTION

A process for bonding two solid articles together comprising coating the surface of one of the articles with a catalyzed unsaturated polyester resin, coating the surface of the other article with a promoted unsaturated polyester resin and bringing and holding each of the coated surfaces into direct contact with one another until the resins cure to the thermoset state, wherein the polyester resins are the esterification reaction products of an α,β-ethylenically unsaturated dicarboxylic acid and a glycol.

In the preparation of the unsaturated polyester resin compositions of the present invention, one should make use of the alpha, beta unsaturated polycarboxylic acids such as maleic, fumaric, aconitic, itaconic, monochloro maleic anhydride and the like. These unsaturated acids should be present in an amount approximating at least 10% by weight of the total weight of the polycarboxylic acids used and preferably in amounts varying between about 20% and 65% by weight based on the total weight of polycarboxylic acid present. If it is desired to make use of saturated polycarboxylic acids, that is, those which are free of non-benzenoid unsaturation, one could use such acids as phthalic, malonic, succinic, glutaric, sebacic and chlorinated polycarboxylic acids such as tetrachlorophthalic anhydride, hexachloroendomethylene tetrahydrophthalic acid and the like. Whenever available the anhydrides of these acids may be used or mixtures of the acids or mixtures of the anhydrides thereof may be used.

As polyhydric alcohols which may be used to prepare the unsaturated polyesters of the present invention, it is preferred to make use of those alcohols having only two hydroxy groups although minor amounts of alcohols having three hydroxy groups, four hydroxy groups or more hydroxy groups may be used in minor amounts. As dihydroxy alcohols, one could use ethylene glycol, diethylene glycol, propylene glycol, dipropylene glycol, butanediol-1,4, butanediol-1,3, butanediol-1,2, pentanediol-1,2, pentanediol-1,3, pentanediol-1,4, pentanediol-1,5, hexanediol-1,6 and the like. Additionally, one could use glycerol, pentaerythritol, dipentaerythritol and the like.

The modifier for the polyester resin is a polymerizable material having a $CH_2=C<$ group. This modifier which is in the nature of a polymerizable monomeric compound may be used in amounts varying between about 10% and 70% by weight based on the total weight of the polyester resin plus monomer composition; and preferably from 25% to 50% by weight of said monomer, same basis. Amongst these polymerizable compounds are styrene, side chain-substituted styrenes such as the alpha methylstyrene, alpha ethylstyrene and the like or ring-substituted styrenes, such as ortho, meta and para-alkyl styrenes such as o-methylstyrene, p-ethylstyrene, meta-propylstyrene, 2,4-dimethylstyrene, 2,5-diethylstyrene, and the like. Still further, one can make use of the allyl compounds such as diallyl phthalate, allyl alcohol, methallyl alcohol, allyl acetate, allyl methacrylate, diallyl carbonate, allyl lactate, allyl alpha-hydroxyisobutyrate, allyl trichlorosilane, allyl acrylate, diallyl malonate, diallyl oxalate, diallyl gluconate, diallyl methylgluconate, diallyl adipate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl cyanurate, triallyl citrate, triallyl phosphate, trimethallyl phosphate, tetraallyl silane, tetraallyl silicate, hexaallyl disiloxane, and the like.

When the unsaturated polyester resin is combined with the polymerizable monomeric material, it is generally desirable to incorporate therein a polymerization inhibitor in order to prevent premature gellation of the resinous composition, particularly if it is expected that said composition will be subjected to long periods of storage or if it is expected that it will be subjected to temperatures significantly higher than room temperature. With the polymerization inhibitor, the resinous composition will remain stable at room temperature for months without noticeable deterioration. Amongst the polymerization inhibitors which may be used are any of those which are conventionally known and used in the art such as hydroquinone, benzaldehyde, ascorbic acid, isoascorbic acid, resorcinol, tannin, symmetrical di-(beta-naphthyl)-p-phenylene diamine, phenolic resins, sulfur compounds and the like. The concentration of the inhibitor is preferably low and as a general rule less than 1% by weight is usually sufficient. The usual range would be .001%–0.1% by weight based on total resin and monomer. However, with the preferred inhibitors, e.g., polyhydric phenols and aromatic amines, one may make use of such small amounts as 0.005%–0.1% by weight.

The catalytic materials which are used in one of the unsaturated polyester resins used in the present invention may be any one of the substantial plurality of conventional polymerization catalysts which have been used with these unsaturated polyester resins for years such as the organic superoxides, the alcoholic and acidic preoxides and the like. Among the preferred catalysts are the acidic peroxides, benzoyl peroxide, acetyl peroxide, decanoyl peroxide and lauroyl peroxide, pelargonyl peroxide, tertiary-butyl hydroperoxide, di-tertiary-butyl-peroxide. Still other polymerization catalysts might be used in some instances, such as methyl ethyl ketone peroxide, bis(1-hydroxycyclohexyl) peroxide, cyclohexanone peroxide and other ketone peroxides and hydroperoxides such as hydrogen peroxide, cumene hydroperoxide and the like. These catalytic materials may be used either singly or in combination with one another but it must be remembered that the unsaturated polyester resin that contains the catalytic material must be devoid of any promoter. The amount of catalyst may vary very appreciably, from about 0.1% to about 10% by weight based on the total weight of the polyester resin or the total weight of the polymerizable composition, whichever is applicable. Preferably, one would use between about 0.5% and 1% by weight of these catalysts based on the total weight of the polymerizable resinous composition.

The polyester resin containing the promoter is devoid of any catalytic agent until the moment that the two polyester resins are compelled to make contact with one another. Among the promoters which may be utilized are the cobalt salts such as cobalt naphthenate or those disclosed in the U.S. Pats. 2,466,800 and 2,480,928. The mercaptans may be used such as n-hexyl mercaptan, n-heptyl mercaptan, n-octyl mercaptan, n-nonyl mercaptan, n-decyl mercaptan, n-undecyl mercaptan, n-dodecyl mercaptan, n-tridecyl mercaptan, n-tetradecyl mercaptan, n-hexadecyl mercaptan, secondary hexyl mercaptan, tertiary hexyl mercaptan, tertiary octyl mercaptan, and the like. The dialkyl substituted anilines are additionally useful as promoters, particularly dimethyl aniline, diethyl aniline, dipropyl aniline, dibutyl aniline and the like. Obviously, these promoters can be used either singly or in combination with one another. The usual range for promoters is 0.05–3%, preferably 0.1–0.5% of each promoter by weight based on the total weight of polyester resin and monomer.

In order that the present invention may be more completely understood, the following examples are set forth in which all parts are parts by weight. These examples are set forth primarily for the purpose of illustration and any specific enumeration of detail set forth therein should not be interpreted as limitations on the case except as indicated in the appended claims.

Resin A

A polyester resin is prepared by reacting 4.60 moles of phthalic anhydride, 1.40 moles of maleic anhydride and 6.38 moles of diethylene glycol. The polyester is reacted in a conventional manner until an acid number of about 30–35 is reached. The polyester resin is then cut with monomeric styrene in a 70/30 blend polyester to styrene, respectively. The viscosity of the cut resin composition was about M on the Gardner scale at 25° C.

EXAMPLE 1

Two polyester resin aliquots were derived from Resin A, each amounting to 100 parts. These 100 parts were comprised of 72 parts of the polyester resin and 28 parts of the styrene. To each aliquot there is added 20 additional parts of styrene and 56 parts of pecan shell flour. The first aliquot is divided into two portions amounting to 88 parts each, the first of which is catalyzed by the addition of one part of methyl ethyl ketone peroxide per 100 parts total of cut resin (72/28). The entire composition is thoroughly mixed in order to insure uniform distribution of the filler, the monomer and the catalyst in the polyester resin system. The second aliquot was again divided into two portions and one portion amounting to 88 parts was promoted by the addition thereto of one part of the mixture of 30% of diethyl aniline and 25% of 12% cobalt octoate in Varsol per 100 parts of cut resin (72/28). As before, the components were thoroughly blended to insure uniform distribution of the filler, the monomer and the promoter throughout the polyester resin system.

A piece of wood is coated with the catalyzed resin so as to impart on the surface of the wood a comparatively uniform layer of the catalyzed polyester resin. A fiberglass reinforced polyester sheet is coated uniformly with the mix of the polyester resin containing the promoter. The wood and the polyester resin sheet are then rubbed together gently and finally the two units are positioned so as to be in the desired final posture and the polyester resins are allowed to cure at room temperature. Elevated temperatures may be used to speed the cure and pressure may also be used, but satisfactory bonding can be and was obtained without pressure.

EXAMPLE 2

The two aliquots from Example 1 to which no peroxide catalyst or promoter had been added are separately maintained and the first aliquot amounting to 88 parts is catalyzed with one part (based on resin) of benzoyl peroxide. Separately, the second aliquot amount to 88 parts is promoted with 0.5% (based on resin) of a cobalt naphthenate solution containing 6% of cobalt by weight. After thorough stirring of each of the two separate aliquots, the outer edge of a glass fiber polyester reinforced thermosetting resin pipe as shown in the U.S. Pat. 3,329,173 is coated to a sufficient depth along its open ended edge with the catalyzed polyester. The inner open ended edge of a pipe-fitting as is shown in the U.S. Pat. 3,468,346 is coated with the promoted polyester to a sufficient depth. The two units being of substantially the same diameter are then slipped together and rubbed so as to distribute the catalyzed polyester resin into the promoted polyester resin and vice versa. The connection is then permitted to stand at room temperature until the polyester resins cure to the thermoset state.

If desired, one may make use of finely divided fillers in the polyester resins used in the present invention in which event wood flour, pecan shell flour, finely divided silica and the like may be used. These fillers will add some body to the adhesive formulation. The amount of filler which may be used can vary between 0% and 100% by weight based on the total weight of polyester resin composition (containing monomer).

We claim:

1. A process for bonding two solid articles together comprising coating the surface of one of the articles with a catalyzed unpromoted unsaturated polyester resin, coating the surface of the other article with a promoted, uncatalyzed unsaturated polyester resin and bringing and holding each of the coated surfaces into direct contact with one another rubbing said solid articles together gently and positioning said units so as to be in the desired final posture, and allowing said polyester resins to cure to the thermoset state, wherein the polyester resins are the esterification reaction products of an $\alpha,\beta$-ethylenically unsaturated dicarboxylic acid and a glycol.

2. The process according to claim 1 in which there is used with at least one of said polyester resins a crosslinking, normally liquid, polymerizable monomer containing a polymerizable $CH_2{=}C{<}$ group.

3. The process according to claim 1 in which there is used with both of said polyester resins a crosslinking, normally liquid, polymerizable monomer containing a polymerizable $CH_2{=}C{<}$ group.

4. The process according to claim 2 in which the polymerizable monomer is styrene.

5. The process according to claim 3 in which the polymerizable monomer is styrene.

6. The process according to claim 3 in which at least one of the solid articles is wood.

7. The process according to claim 6 in which the other solid article is a glass fiber reinforced polyester resin molded article.

8. The process according to claim 5 in which at least one of the solid articles is wood.

9. The process according to claim 5 in which at least one of the solid articles is glass fiber reinforced polyester resin molded article.

10. The process according to claim 1 in which at least one of the polyester resins contains a filler.

References Cited
UNITED STATES PATENTS

| | | | |
|---|---|---|---|
| 3,037,900 | 6/1962 | Hings et al. | 156—310 |
| 3,231,443 | 1/1966 | McNulty | 156—310 |
| 2,968,335 | 1/1961 | Monaco et al. | 156—310 |
| 2,557,826 | 6/1951 | Keaton et al. | 156—310 |
| 2,928,804 | 3/1960 | Foster et al. | 156—310 |

REUBEN EPSTEIN, Primary Examiner

U.S. Cl. X.R.

156—332

UNITED STATES PATENT OFFICE
CERTIFICATE OF CORRECTION

Patent No. 3,697,353          Dated October 10, 1972

Inventor(s) RENE ROBERT BROCHU AND LYTTON TAYLOR

It is certified that error appears in the above-identified patent and that said Letters Patent are hereby corrected as shown below:

Column 4, Claim 1, line 71 insert -- , -- following the word "catalyzed".

Column 4, Claim 1, line 75 insert -- , -- following the word "another".

Signed and sealed this 29th day of May 1973.

(SEAL)
Attest:

EDWARD M. FLETCHER, JR.
Attesting Officer

ROBERT GOTTSCHALK
Commissioner of Patents